(12) United States Patent
Scharnagle, III et al.

(10) Patent No.: US 8,588,944 B1
(45) Date of Patent: Nov. 19, 2013

(54) VIRTUAL USER-BASED SCORING OF REAL EVENTS

(75) Inventors: Charles William Scharnagle, III, Mendon, MA (US); George Wood, Lebanon, CT (US); Timothy Ems, East Haddam, CT (US); Michael Spellman, Groton, CT (US)

(73) Assignee: The Mohegan Tribe of Indians of Connecticut, Uncasville, CT (US)

( * ) Notice: Subject to any disclaimer, the term of this patent is extended or adjusted under 35 U.S.C. 154(b) by 0 days.

(21) Appl. No.: 13/525,967

(22) Filed: Jun. 18, 2012

(51) Int. Cl.
*G06F 17/00* (2006.01)

(52) U.S. Cl.
USPC .................................. 700/92; 463/1; 463/42

(58) Field of Classification Search
USPC .............. 463/25, 29, 40–42, 1; 700/91–93
See application file for complete search history.

(56) References Cited

U.S. PATENT DOCUMENTS

| | | | | |
|---|---|---|---|---|
| 4,592,546 | A * | 6/1986 | Fascenda et al. | 463/29 |
| 4,722,526 | A * | 2/1988 | Tovar et al. | 463/9 |
| 6,135,881 | A * | 10/2000 | Abbott et al. | 463/3 |
| 6,287,199 | B1 * | 9/2001 | McKeown et al. | 463/40 |
| 6,293,868 | B1 * | 9/2001 | Bernard | 463/42 |
| 6,394,895 | B1 * | 5/2002 | Mino | 463/3 |
| 7,334,796 | B2 * | 2/2008 | Wittwer | 273/277 |
| 7,607,403 | B2 * | 10/2009 | Walters | 116/222 |
| 7,909,332 | B2 * | 3/2011 | Root | 273/461 |
| 8,449,361 | B2 * | 5/2013 | Laycock et al. | 463/9 |
| 2004/0005534 | A1 * | 1/2004 | Vickroy | 434/247 |
| 2005/0239551 | A1 * | 10/2005 | Griswold et al. | 463/42 |
| 2009/0298564 | A1 * | 12/2009 | Walker | 463/7 |
| 2009/0312103 | A1 * | 12/2009 | Chen | 463/41 |
| 2012/0084170 | A1 * | 4/2012 | Adair et al. | 705/26.3 |
| 2012/0129585 | A1 * | 5/2012 | Laycock et al. | 463/9 |
| 2012/0178535 | A1 * | 7/2012 | Short | 463/42 |
| 2013/0060362 | A1 * | 3/2013 | Murphy et al. | 700/93 |

OTHER PUBLICATIONS

"King of Predictions" by KingofPredictions.com. [online], [retrieved Apr. 11, 2013]. <URL:http://www.kingofpredictions.com>. Copyright 2011. 7 Pages.*

"FanCake—Rewarding Sports Fans" by UDM4.com [online], [dated Oct. 10, 2011], [retrieved on Apr. 11, 2013]. <URL:http://udm4.com/iPhone/FanCake_Rewarding_Sp-601202>. 3 Pages.*

(Continued)

*Primary Examiner* — Milap Shah
(74) *Attorney, Agent, or Firm* — Cantor Colburn LLP

(57) ABSTRACT

Electronic entertainment scoring is provided. The electronic entertainment scoring includes creating an event record for an event, receiving a request from a device to electronically participate in scoring the event, and generating an event card including event data for the event. The event data includes an event date, event parties, and a scoring mechanism. The electronic entertainment scoring also includes transmitting the event card to the device subject to the request. The event card is configured to enable features of an application on the device. The electronic entertainment scoring also includes entering an identifier of a user of the device in the event record, tracking score values submitted by the device in the event record via the identifier, and transmitting, to the device, a summation of accumulated score values received from other devices that are electronically participating in the scoring of the event.

20 Claims, 8 Drawing Sheets

(56) References Cited

OTHER PUBLICATIONS

"MMA Scorecard app" by gameson77. YouTube—Broadcast Yourself. [dated May 29, 2011], [online], [retrieved on Apr. 11, 2013]. <URL:http://www.youtube.com/watch?v=hAHIf97Q5Zw>. Including Still Image of Video. 3 Pages.*

"What is GrabFan?" by GrabVids. YouTube—Broadcast Yourself. [dated May 12, 2012], [online], [retrieved on Apr. 11, 2013]. <URL:http://www.youtube.com/watch?v=jG_Dh1B4Agg>. Including Still Image of Video. 2 Pages.*

Go Sports, [online]; [retrieved on Jun. 18, 2012]; retrieved from the Internet http://gamesonsports.com/mma-scorecard/ Gamesonsports.com,"MMA Scorecard," 2010; pp. 1-2; Games on Sports, LLC.

SherDog.com, [online]; [retrieved on Jun. 18, 2012]; retrieved from the Internet http://www.sherdog.com/news/pressreleases/Real-time-scoring-in-first-ever-MMAprediction-game-for-smart-phones-31928 SherDog.com,"Real Time Scoring in First Ever MMA Prediction Game for Smart Phones," 2011; pp. 1-3.

* cited by examiner

VIRTUAL USER-BASED SCORING OF REAL EVENTS

FIELD OF THE INVENTION

The subject invention relates to digital entertainment services, and more particularly, to virtual scoring of real events.

BACKGROUND

Social media resources provide vast opportunities for individuals to engage in electronic communications and share information across a multitude of different computing platforms. For example, due to the popularity of small portable devices, mobile applications for social networking have become increasingly popular for those who like to stay connected even when away from home.

When an event is attended by a large group of people, there is limited opportunity for event-goers to share information with one another or to interact with elements of the event.

Accordingly, it is desirable to provide a way for individuals to share information concerning an event and to participate in evaluating aspects of the event, the results of which can be made available for sharing with one another.

SUMMARY OF THE INVENTION

In one exemplary embodiment of the invention, a system for implementing electronic entertainment scoring services is provided. The system includes a host system computer, and logic executable by the host system computer. The logic is configured to implement a method. The method includes creating an event record for an event, receiving a request from an end user device to electronically participate in scoring the event, and generating an event card including event data for the event. The event data includes an event date, event parties, and a scoring mechanism. The electronic entertainment scoring also includes transmitting the event card to the end user device subject to the request. The event card is configured to enable features of an application on the end user device. The electronic entertainment scoring also includes entering an identifier of a user of the end user device in the event record, tracking score values submitted by the end user device in the event record via the identifier, and transmitting, to the end user device, a summation of accumulated score values received from other end user devices that are electronically participating in the scoring of the event.

In another exemplary embodiment of the invention, a computer program product for implementing electronic entertainment scoring services is provided. The computer program product includes a computer-readable storage medium encoded with instructions, which when executed by a computer cause the computer to implement a method. The method includes creating an event record for an event, receiving a request from an end user device to electronically participate in scoring the event, and generating an event card including event data for the event. The event data includes an event date, event parties, and a scoring mechanism. The electronic entertainment scoring also includes transmitting the event card to the end user device subject to the request. The event card is configured to enable features of an application on the end user device. The electronic entertainment scoring also includes entering an identifier of a user of the end user device in the event record, tracking score values submitted by the end user device in the event record via the identifier, and transmitting, to the end user device, a summation of accumulated score values received from other end user devices that are electronically participating in the scoring of the event.

In a further exemplary embodiment of the invention, a method for implementing electronic entertainment scoring services is provided. The method includes creating an event record for an event, receiving a request from an end user device to electronically participate in scoring the event, and generating an event card including event data for the event. The event data includes an event date, event parties, and a scoring mechanism. The electronic entertainment scoring also includes transmitting the event card to the end user device subject to the request. The event card is configured to enable features of an application on the end user device. The electronic entertainment scoring also includes entering an identifier of a user of the end user device in the event record, tracking score values submitted by the end user device in the event record via the identifier, and transmitting, to the end user device, a summation of accumulated score values received from other end user devices that are electronically participating in the scoring of the event.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
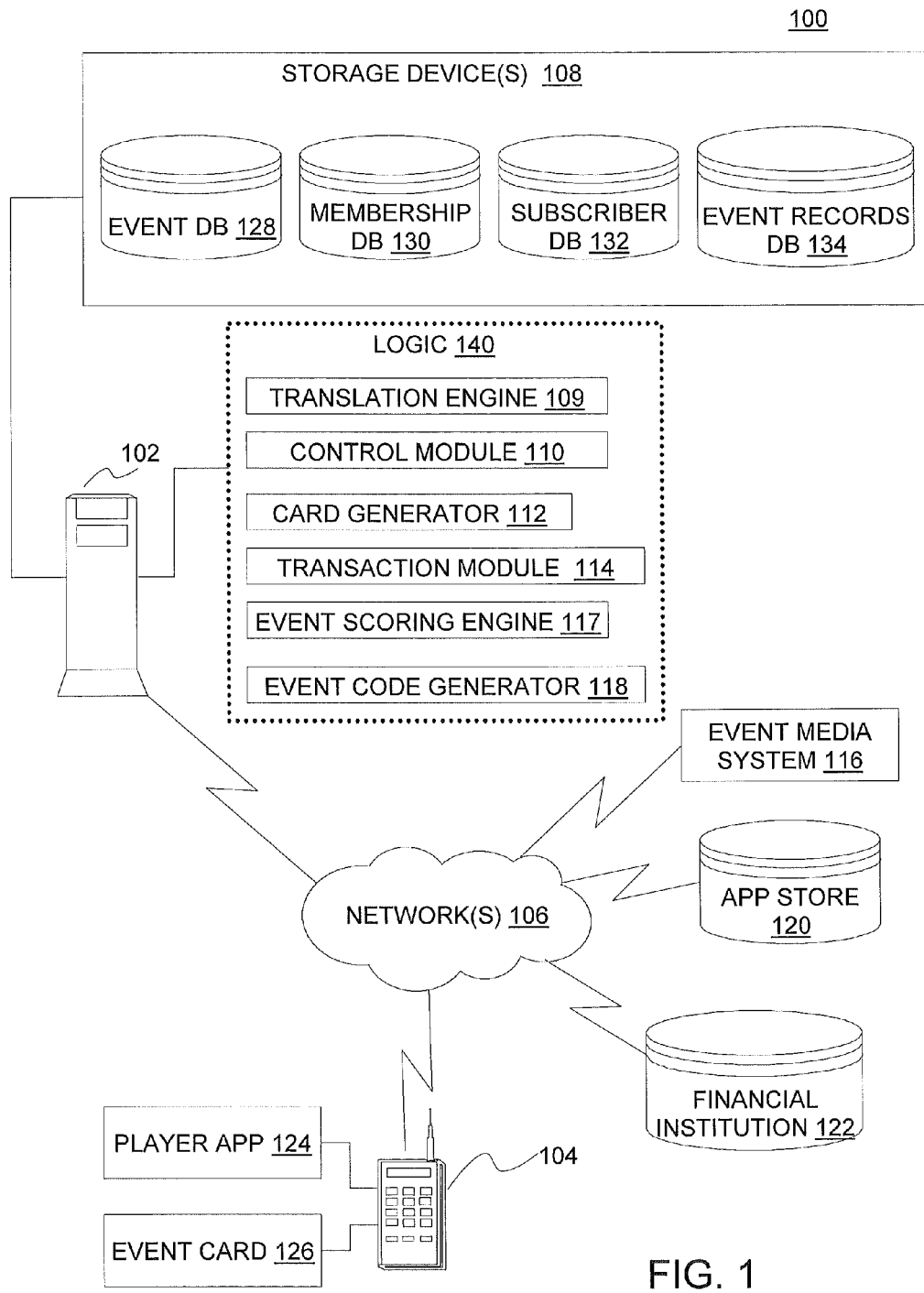
FIG. 1 is a system upon which virtual scoring of real events may be implemented in accordance with an exemplary embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, virtual scoring of real events (also referred to herein as "event scoring") is provided. The event scoring enables individuals to participate in evaluating aspects of a real event and share this information with other individuals. A real event refers to a real-life performance or competition, as opposed to a computerized rendition of an event. The real event may be competitive or non-competitive. Non-limiting examples of real events include concerts, plays, game shows, boxing matches, swimming competitions, and Olympic™ events, to name a few.

In one embodiment, where the event is competitive, virtual scoring refers to ratings of the event provided by individuals (e.g., spectators), which ratings are not considered in the outcome of the competitive event. Rather, a designated officiating entity (e.g., a panel of judges) is tasked with this function. The scores submitted by individuals are used for entertainment purposes and for drawing comparisons between the user scores and the official scores, as well as among the users' scores themselves. The scores submitted by the individuals may also be used for training purposes, such as comparing an individual's scores with those of an expert or experienced judge to determine a judging skill level of the individual. When the event is non-competitive, such as a concert, the virtual scoring may not be compared to any officiating entity scores, but rather to the scoring of other users participating in the scoring of the event. In this embodiment, the ratings may impact the event outcome, such as causing a performer to change a line-up of music based on viewer evaluations of the performance.

Turning now to FIG. 1, a system 100 upon which event scoring may be implemented will now be described in an exemplary embodiment. The system 100 includes a host system computer 102 in communication with an end user device 104 over one or more networks 106. The host system 102 may also be in communication with network entities that include an event media system 116, one or more application stores 120, and one or more financial institutions 122 over the networks 106.

The host system 102 may be implemented by an enterprise or organization hosting the event scoring and is configured with logic 140 for executing features of the event scoring described herein. In another embodiment, the host system 102 may be implemented by an application service provider (ASP) that engages with event provider entities to provide the event scoring to end users (e.g., event-goers, event-viewers). In this embodiment, consumers of the event scoring services may include event provider entities that contract for the services through the ASP and provide the event scoring to their respective customers (e.g., end users).

The host system 102 may be implemented as a high-speed computer processing device (e.g., a web server computer) capable of handling a high volume of activities conducted between the host system 102, end user devices (e.g., end user device 104), and the network entities, such as application store 120 and financial institution 122 shown in FIG. 1.

The host system 102 may operate as a web server including a web site for generating member and/or subscription accounts for event scoring, as well as for providing access to event scoring information to end users or consumers. The host system 102 may also operate as an application server including applications for providing the event scoring described herein. These applications are collectively referred to as logic 140.

The networks 106 may be any type of known networks in the art. For example, the networks 106 may be a combination of public (e.g., Internet), private (e.g., local area network, wide area network, virtual private network), and may include wireless and wireline transmission systems (e.g., satellite, cellular network, terrestrial networks, etc.).

The end user device 104 may be a portable device, such as a smart phone, tablet PC, or personal digital assistant. In this embodiment, a user of the portable end user device 104 may be physically present at an event when participating in the event scoring activities described herein. In another embodiment, the end user device 104 may be a general-purpose computer, such as a desktop or laptop computer, or may be a gaming device, such as an Xbox™, PlayStation™ or Wii™ device. In this embodiment, the end user device 104 may be viewing the event either via a live media feed (e.g., pay-per-view) or other streamed media, or may have recorded the event and is viewing a recording when engaging in a version of the event scoring activities.

The end user device 104 may be implemented by an individual who has subscribed to the event scoring or who is a member of an entity serviced by the host system 102. For example, if the host system 102 is operated by a casino and the event scoring is provided as a service by the casino, a member of the casino may have established a direct relationship with the casino aside from the event scoring. Memberships administered by the casino may involve a point system in which members accumulate points based at least in part on the frequency of visits to the casino and/or an amount of money spent at the casino. This information may be tracked by the host system 102 via member cards issued to the members for tracking various activities. The members may be identified by a member identification number and unique PIN. In this embodiment, the logic 140 may be configured to connect to a back end system of the casino to facilitate the use of points by earned by members as payment for implementing event scoring activities. This feature is described further herein (e.g., in FIG. 3).

Alternatively, or in addition thereto, an end user device 104 may be implemented by an individual who is not a member of the entity (e.g., casino) serviced by the host system 102. The individual may register or subscribe for the event scoring activities via a separate mechanism than the membership system described above (see, e.g., FIG. 3).

For ease of illustration, only a single end user device 104 is shown in FIG. 1. However, it will be understood that any number of end user devices may be employed in realizing the advantages of the exemplary embodiments.

The end user device 104 executes a player application 124. In one embodiment, the player application 124 may be a mobile application configured to execute on smaller, portable computing devices. Alternatively, the player application 124 may be designed to execute on a standard computer. The player application 124 contains the framework and instructions for enabling the end user device 104 to participate in scoring an event. Particularized information associated with the event, however, is stored in an event card 126, which is downloadable to the end user device 104 from the host system 102 over the network(s) 106. The event card 126 is configured to enable features of the player application 124 on the end user device 104. The event card 126 is generated by the host system 102. The event card 126 data may be implemented, e.g., using HTML and includes event description, event participants, event dates/times, and an event scoring mechanism (e.g., instructions and relevant score criteria and acceptable values). The event card 126 is preconfigured with this information such that an end user does not need to separately enter data for each desired event.

The host system 102 is communicatively coupled to one or more storage devices 108. The storage device 108 may be implemented using a variety of devices for storing electronic information. It is understood that the storage device may be implemented using memory contained in the host system 102 or it may be a separate physical device. In one embodiment, the storage device 108 may be logically addressable as a consolidated data source across a distributed environment that includes the networks 106. Information stored in the storage device 108 may be retrieved and manipulated via the host system 102 and authorized users. As shown in FIG. 1, the storage device 108 includes an event database 128, a membership database 130, a subscriber database 132, and an event records database 134.

As indicated above, the host system 102 includes logic 140 for implementing event scoring. As shown in FIG. 1, the logic 140 includes a translation engine 109, a control module 110, a card generator 112, a transaction module 114, an event scoring engine 117, and an event code generator 118.

The translation engine 109 is configured to convert data stored in proprietary or legacy databases to a format that is understandable by other applications of the logic 140. For example, if the exemplary event scoring services are provided, e.g., to third-party enterprises, each of which operates on various differing computer platforms and includes legacy database systems, the translation engine 109 includes Extract, Transform, and Load (ETL) instructions for extracting relevant data from these systems and converting the data to a format that can be used by the logic 140 applications.

The control module 110 is configured to provide an interface between the host system 102 and the end user device 104. The control module 110 also includes instructions for monitoring data processed by the translation engine 109 from the event database 128. For example, the control module 110 monitors the processed data from event database 128 for new events that are scheduled for an arena (e.g., a casino) managed by the host system 102 and for creating event records when new events are determined from the monitoring. The event records include event identifiers, member identifiers, subscriber identifiers, event card codes, score values associated with the member and subscriber identifiers, and reward data, as will be described further herein. The event records are stored in the event records database 134. The control module 110 also handles requests from end user devices for participating in the event scoring activities, and acts as a liaison to other applications of the logic 140 in handling these requests, as will be described further in FIG. 2.

The card generator 112 creates event cards (e.g., event card 126) from the event data generated by the control module 110 and also based on requests from end user devices. Each event card 126 is a unique instance of the event data and related instructions for facilitating event scoring activities, which is attributed to a qualifying end user and is distinguished by a unique event card code, as described further herein.

The transaction module 114 handles various methods of payment for implementing the event scoring activities by end users and interfaces with other applications of the logic 140, as will be described further herein.

The event scoring engine 117 electronically captures scores submitted by individuals of a designated officiating system for the event. The event scoring engine 117 also receives and processes scores submitted by end user devices participating in the event scoring. This information is tracked in the event records database 134. The event scoring engine 117 may also include a timing mechanism adapted to track scoring activities conducted during live events. These and other functions of the event scoring engine 117 will be described further herein.

The event code generator 118 is configured to generate event card codes that uniquely identify the events as well as uniquely identify an instance of the event card. In an embodiment, the event code generator 118 generates a set of unique event card codes (e.g., using a random number generator) and may provide at least a portion of these codes to an external provider that generates and sells event tickets. The external provider is instructed to print one of these event card codes for each ticket generated and sold. The event card code printed on a ticket serves to authorize the end user who purchased the ticket to participate in the event scoring activities described herein. In an embodiment, an additional fee may be added to the cost of ticket for this added service. In an alternative embodiment, the event code generator 118 generates the event card codes and issues these codes to end users who purchase event cards via end user devices, such as end user device 104. This embodiment is described further herein.

As indicated above, the host system 102 is also communicatively coupled to one or more storage devices 108. The event database 128 stores scheduled events to take place at venues associated with the entity serviced by the host system 102. The membership database 130 stores member information for members of the entity, such as name, address, contact information, membership identification, and PIN number. In addition, the membership database 130 may store point balance information earned by participating members. Further, the membership database 130 may store financial account information of the members, as described further herein. The event database 128 and the membership database 130 may be proprietary back-end systems of the entity serviced by the host system 102. In this embodiment, the translation engine 109 is configured to communicate with these systems, as indicated above.

The subscriber database 132 stores information associated with individuals who have registered for the event scoring services, such as name, contact information, and subscriber identification. In addition, the subscriber database 132 may store financial account information of the subscribers. The event records database 134 stores the event records created by the control module 110. The event records are described further herein.

Figure 2:
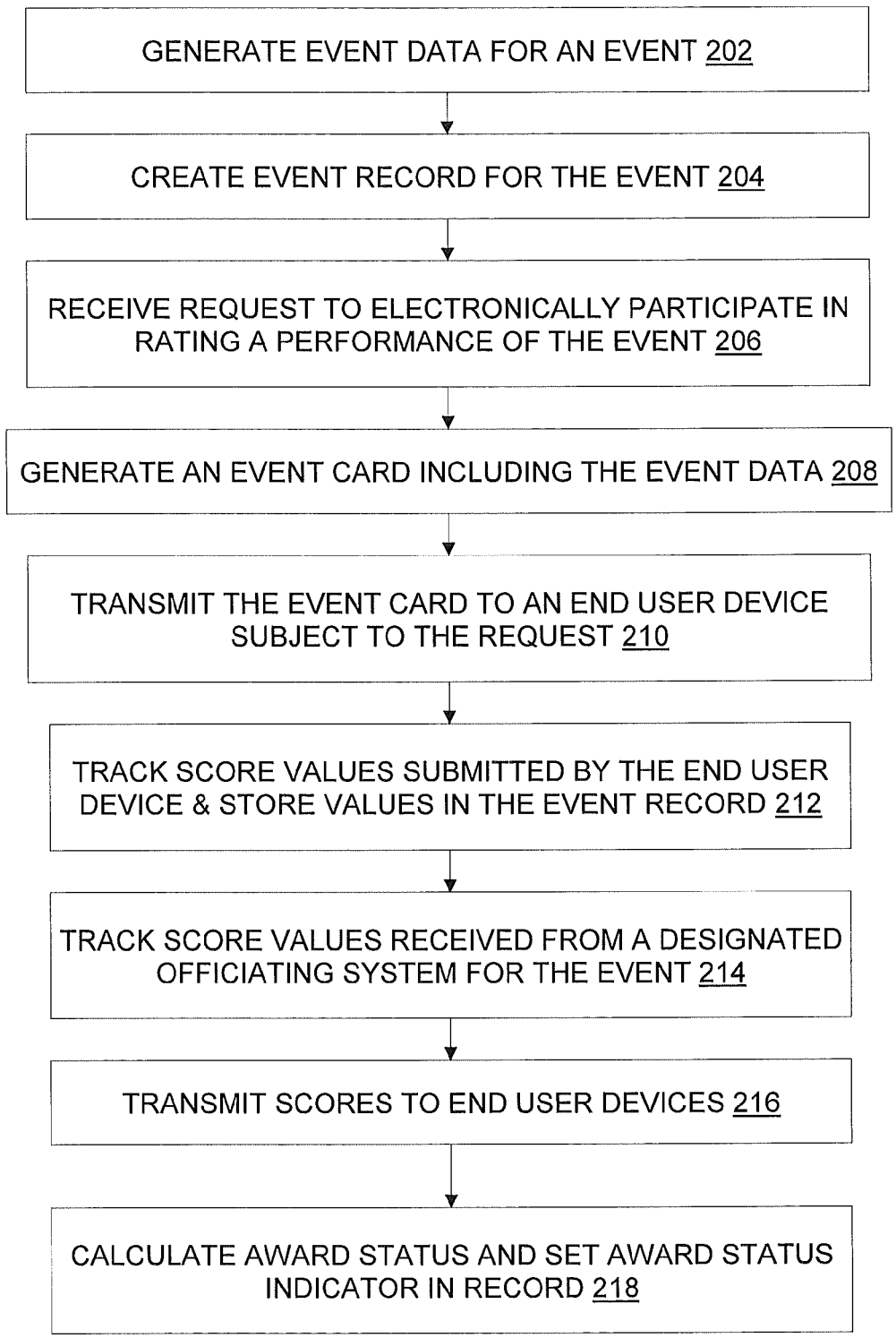
FIG. 2 is a flow diagram describing a process for implementing virtual scoring of real events in accordance with an exemplary embodiment.

Turning now to FIG. 2, a process for implementing the event scoring and output produced by the event scoring will now be described in an exemplary embodiment. By way of non-limiting example, the process described in FIG. 2 is directed to an enterprise that hosts events at its facilities and also provides various goods and services to its customers, who may be members of the enterprise. For example, in one embodiment, the host system 102 operates a casino having one or more arenas or venues for holding events, as well as a number of stores, restaurants, and hotel on the property. For purposes of illustration, and by way of non-limiting example, the event described herein refers to a boxing match. The process of FIG. 2 also assumes that the end user device 104 has downloaded the player application 124 from an application store 120 or other source.

At step 202, the control module 110 generates event data for an event. The event data is generated in response to monitoring the data processed by the translation engine 109 from event database 128 with respect to new events or entries entered into the database 128, e.g., the boxing match event described herein.

At step 204, the control module 110 creates an event record for the event. A sample data structure that may be used to record data for an event is shown below:

```
EVENT_ID
    MBR_ID1
        EVENT_CARD_CODE
        SCORE_VALUE1
        SCORE_VALUE2
        . . .
        SCORE_VALUEn
        SCORE_VALUE_TOTAL
        SCORE_VALUE_AVG
        REWARD_INDICATOR_VALUE
    MBR_ID2
    . . .
    MBR_IDn
    SCORE_VALUE_AGGREGATE_AVG
```

The EVENT_ID corresponds to a unique identifier assigned to the event. The MBR_ID corresponds to each member who participates in scoring the event, as described further herein. It will be understood that a subscriber ID may also be included in the data structure above. The event record is stored with other event records in the event records database 134 of the storage device 108.

Figure 3:
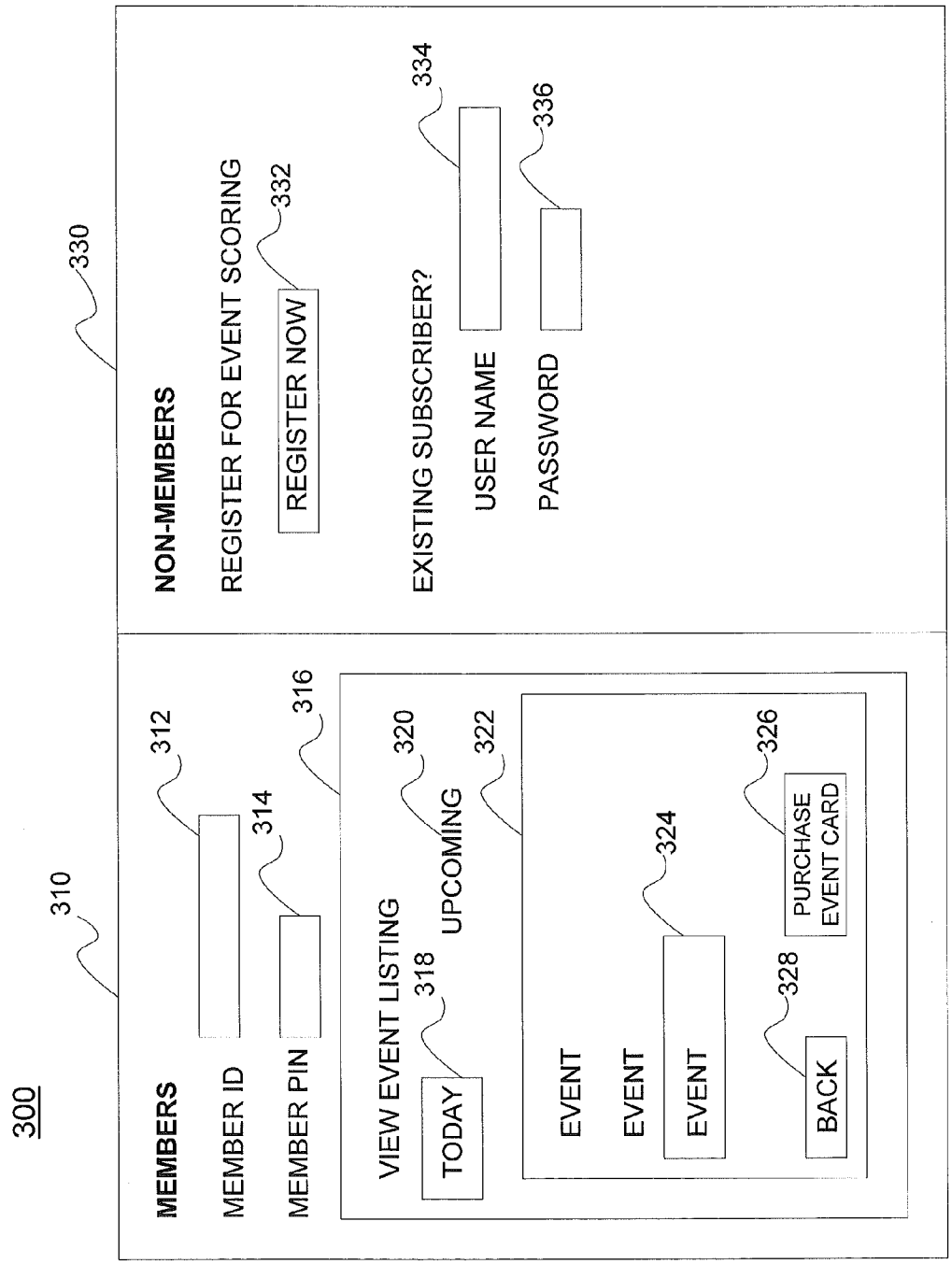
FIG. 3 is a user interface screen for implementing a request to participate in virtual scoring of real events in accordance with an exemplary embodiment of the invention.

At step 206, the control module 110 receives a request from the end user device 104 to participate in scoring the event. The request may be implemented via a user interface screen provided by the host system 102. As shown in FIG. 3, a user interface screen 300 includes two panels 310 and 330. The panel 310 may be utilized by existing members of the enterprise serviced by the host system 102. The members may be issued membership cards storing member information, such as name, membership identifier, and a user-created PIN. This information may be used by the control module 110 to identify the end user accessing the system. As shown in the panel 310, for example, the user may be authenticated by entering a membership identification in a field 312 and a PIN value in a field 314. Once validated, the control module 110 displays a subwindow 316 that enables the user to view events. As shown in FIG. 3, e.g., the subwindow 316 includes one option to view events scheduled for the current day (TODAY 318) or upcoming events (UPCOMING 320). As shown in FIG. 3, the user has selected TODAY 318, and the control module 110 displays another subwindow 322 that lists all the events scheduled for the current day. The events may be listed according to a descriptor that identifies the event (in this example, boxing matches) and may include start times. If the user does not select an event, the user may return to a previous menu by selecting an option BACK 328 on the subwindow 322.

As shown in FIG. 3, the user has selected event 324. The selection of the event 324 is indicative of the request from the user to participate in rating or scoring the event 324 provided in step 206. The user submits the request to the control module 110 by selecting an option PURCHASE EVENT CARD 326 from the subwindow 322. Once the user submits the request, the transaction module 114 transmits a payment screen, for example, a user interface screen 400 as shown in FIG. 4.

In an embodiment, if the user is not a member of the enterprise providing the events, the user may utilize panel 330 of the user interface screen 300 in order to register for an event, via an option REGISTER NOW 332 or, if already registered, may enter a user name in field 334 and password in field 336. Once validated by the transaction module 114, the transaction module 114 displays subwindows similar to those described above (e.g., subwindows 316 and 322) in order to present a listing of events and option to select and purchase an event card. Similar to the process described above regarding members, once the registered user or subscriber has been validated, the transaction module 114 displays the user interface 400 shown in FIG. 4.

Figure 4:
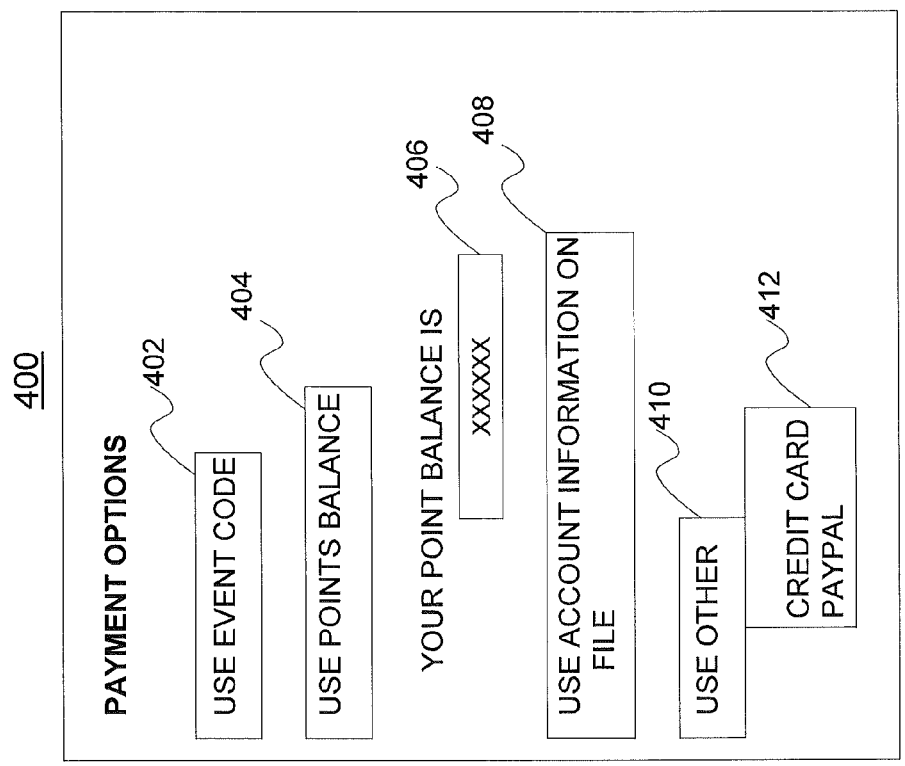
FIG. 4 is a user interface screen for implementing a payment component of the virtual scoring of real events in accordance with an exemplary embodiment.

As shown in FIG. 4, the transaction module 114 provides the user with various payment options for purchasing the event card. If the user has already purchased a ticket for attending the event at the event arena, e.g., from the external ticket provider system described above, the user selects an option USE EVENT CODE 402, which causes the transaction module 114 to provide a mechanism for the user to enter the event card code printed on the ticket, as will be described further in FIG. 6. Alternatively, if the user is a current member and carries a positive point balance (as shown in field 406), the user may select an option USE POINTS BALANCE 404 to purchase the event card. Alternatively, the host system 102 may store financial account information in the membership database 130 (for members) and in the subscriber database 132 (for non-members who have subscribed to the event scoring). The user may then select an option USE ACCOUNT INFORMATION ON FILE 408 to purchase the event card. In a further embodiment, the transaction module 114 may be configured to enable the user to provide financial account information whereby the transaction module 114 accesses a financial institution 122 over networks 106 to execute a purchase transaction. The user selects an option USE OTHER 410 to utilize this feature, which causes a subwindow 412 to be displayed that includes other payment options, such as other credit cards or Paypal™.

Figure 6:
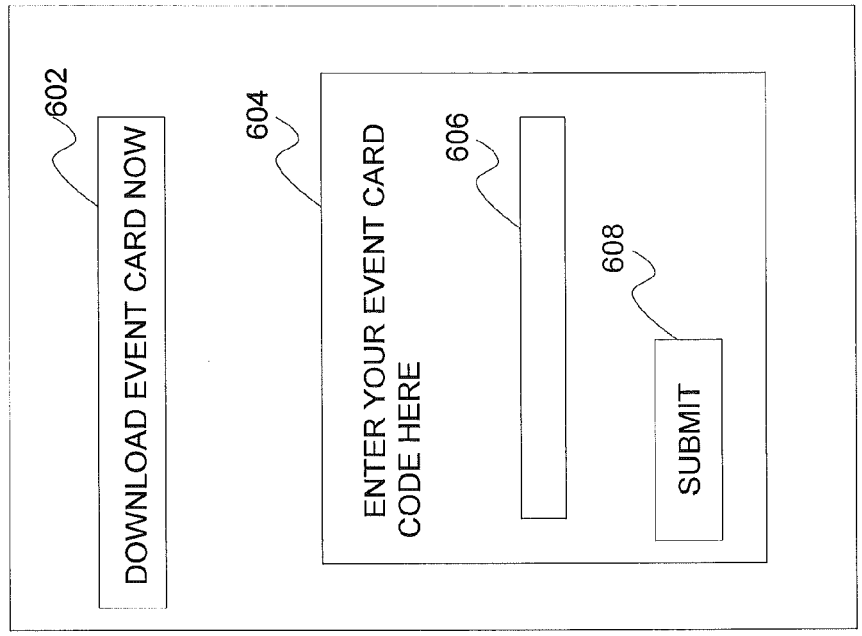
FIG. 6 is a user interface screen for facilitating a download of an event card used in implementing the virtual scoring of real events in accordance with an exemplary embodiment.

The transaction module 114 processes the purchase by the user according to the selected payment option. For example, if the user selected the option to use the points balance as payment for the event scoring, the transaction module 114 accesses the data processed by the translation engine 109 from the membership database 130 and decrements the points balance for the member accordingly. The transaction module 114 updates the event record for the event in the events record database 134 to reflect the member identification (or alternatively, the subscriber identification). Alternatively, the user has selected USE EVENT CODE 402, the user is prompted to enter the code printed on the ticket, as shown in FIG. 6.

Figure 5:
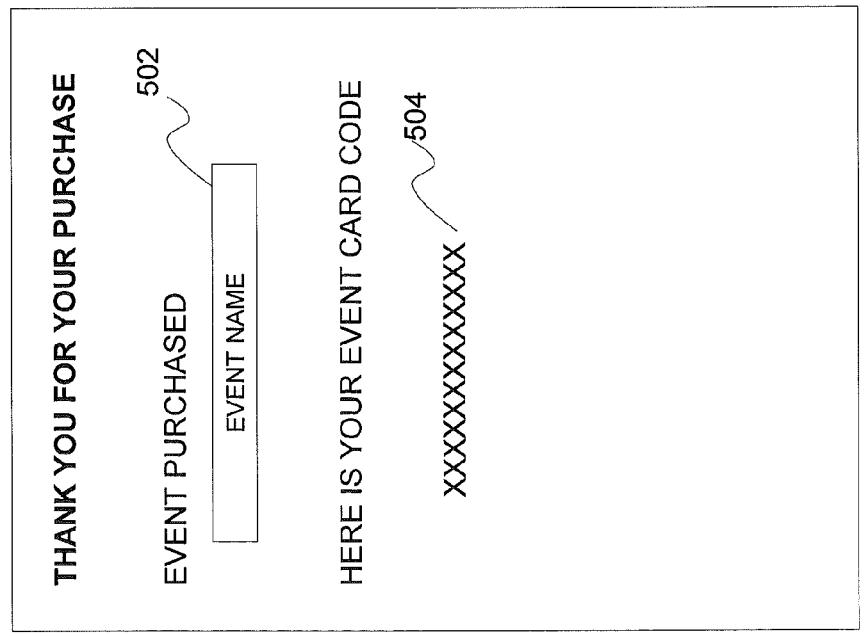
FIG. 5 is a user interface screen for implementing a confirmation of a purchase of the virtual scoring of real events in accordance with an exemplary embodiment.

The transaction module 114 transmits payment confirmation information, e.g., via a user interface screen 500 as shown in FIG. 5 to confirm the purchase of the event card. As shown in FIG. 5, the selected event is displayed generally at 502, and an event card code 504 is displayed, which identifies the event and the unique instance of the event card purchased by the user.

At step 208, the card generator 112 generates an event card 126 including the event data and the event card code 504. The event card 126 includes information associated with the event, such as the date the event will take place, the time of the event, the parties to the event (e.g., actors, musicians, athletes, etc.), as well as a scoring mechanism. The scoring mechanism may be implemented in accordance with the type of event. For example, if the event is a competitive event that defines a scoring system of three judges and point values ranging from 1-10, the scoring mechanism includes this information in the event card. Non-competitive events may utilize a random or host system-defined scoring system. For example, suppose the event is a music concert. The participants viewing the event may be prompted to score each song, or singer, on a scale of 1-10. It will be understood that the scoring mechanism will vary based on the nature of the event.

As indicated above, the event record for the event is updated with an identifier of the user (e.g., member ID or subscriber ID) of the end user device 104. The control module 110 transmits instructions for downloading the event card, e.g., via a user interface screen 600 that includes an option 602 for the user to download the event card. Upon selection of the option 602, the control module 110 provides a subwindow 604 prompting the user to enter the event card code 504 in a field 606 of the subwindow 604. Once the user has entered the event card code 504 in the field 606 and hits SUBMIT 608, the control module 110 validates the event card code 504.

At step 210, once the event card code 504 is successfully validated, the control module 110 transmits the event card 126 including the event data to the end user device 104, which is downloaded to the device 104. A sample user interface screen 700 illustrating features of the player application 124 with integrated event card data is shown in FIG. 7.

Figure 7:
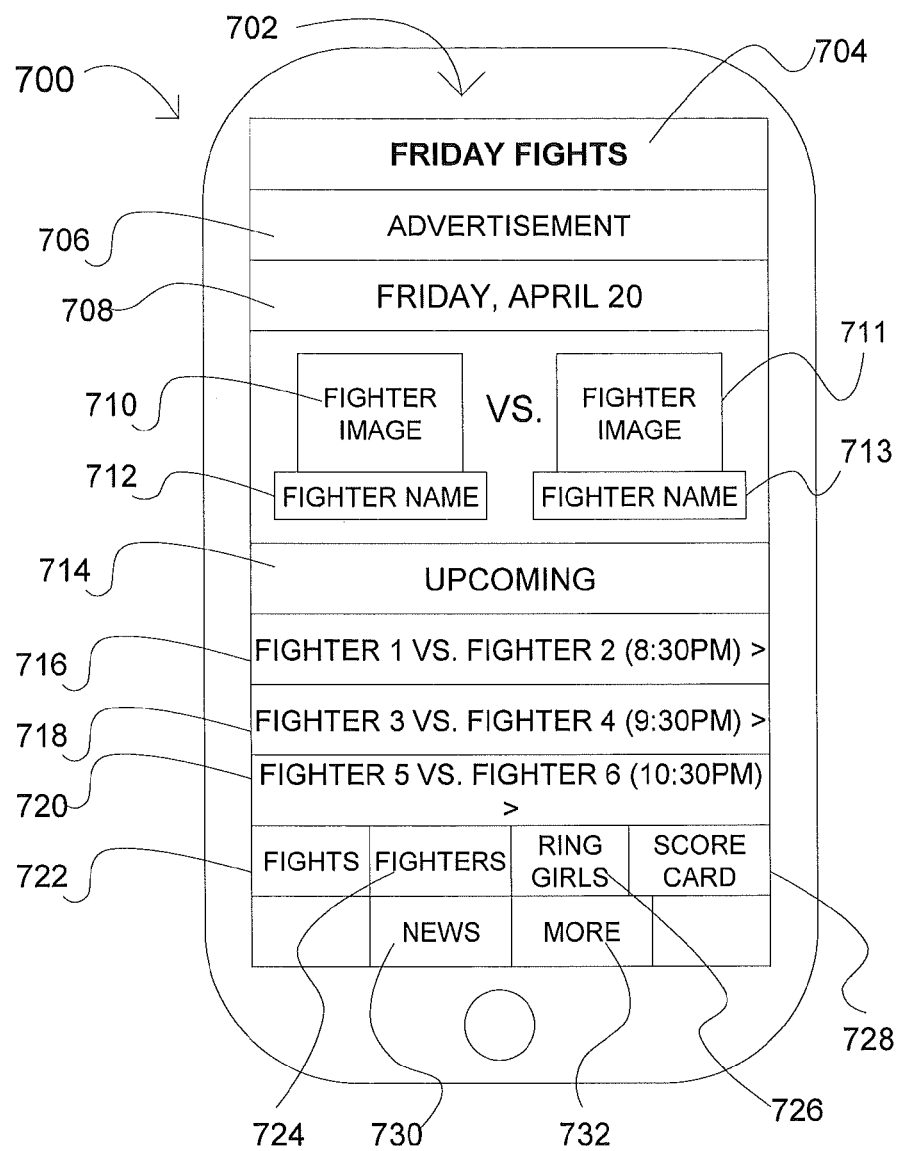
FIG. 7 is a user interface screen including event listings for use in implementing the virtual scoring of real events in accordance with an exemplary embodiment.

As shown in FIG. 7, an end user device 700 (which corresponds to the end user device 104 of FIG. 1) includes a display screen 702 that displays event data for boxing matches. The display screen 702 shown in FIG. 7 includes a bar 704 indicating the user is viewing data for boxing events scheduled for Friday. Another bar 706 may be used for advertising, if desired. A third bar 708 displays the event date. Also illustrated on the display screen 702 are images of the fighters in boxes 710 and 711, respectively, as well as names of the fighters in boxes 712 and 713, respectively. A descriptor bar 714 indicates the user is viewing upcoming events for the date. As shown in bars 716, 718, and 720, three matches are listed for this date along with their scheduled times.

The display screen 702 may also include options 722, 724, 726, 728, 730, and 732 for providing additional information to the end user. For example, the particular information provided in display screen 702 is presented to the user when the user selections option 722 (FIGHTS). This option enables the user to view the upcoming fights scheduled for the selected date.

Option 724 (FIGHTERS), upon selection by the user, provides additional information concerning the fighters for a selected match. For example, the user highlights the match shown in bar 716, followed by the selection of option 724, and the player application 124 accesses a storage system (e.g., one of the storage devices 108) that houses this information, e.g., via the host system 102. The information associated with the fighters may include fighter weight or weight class, performance history, and other indicia. The fighter information stored in the storage system may be linked to the match selection in each of the bars 716, 718, and 720, and processed, e.g., using any database management system technologies under the control of the host system 102.

Option 726 (RING GIRLS), upon selection by the user, provides additional information concerning the ring girls who are present at a selected boxing match (e.g., one of the bars 716, 718, and 720). Similar to the fighters described above, the information relating to the ring girls may be stored in the storage device 108.

Figure 8:
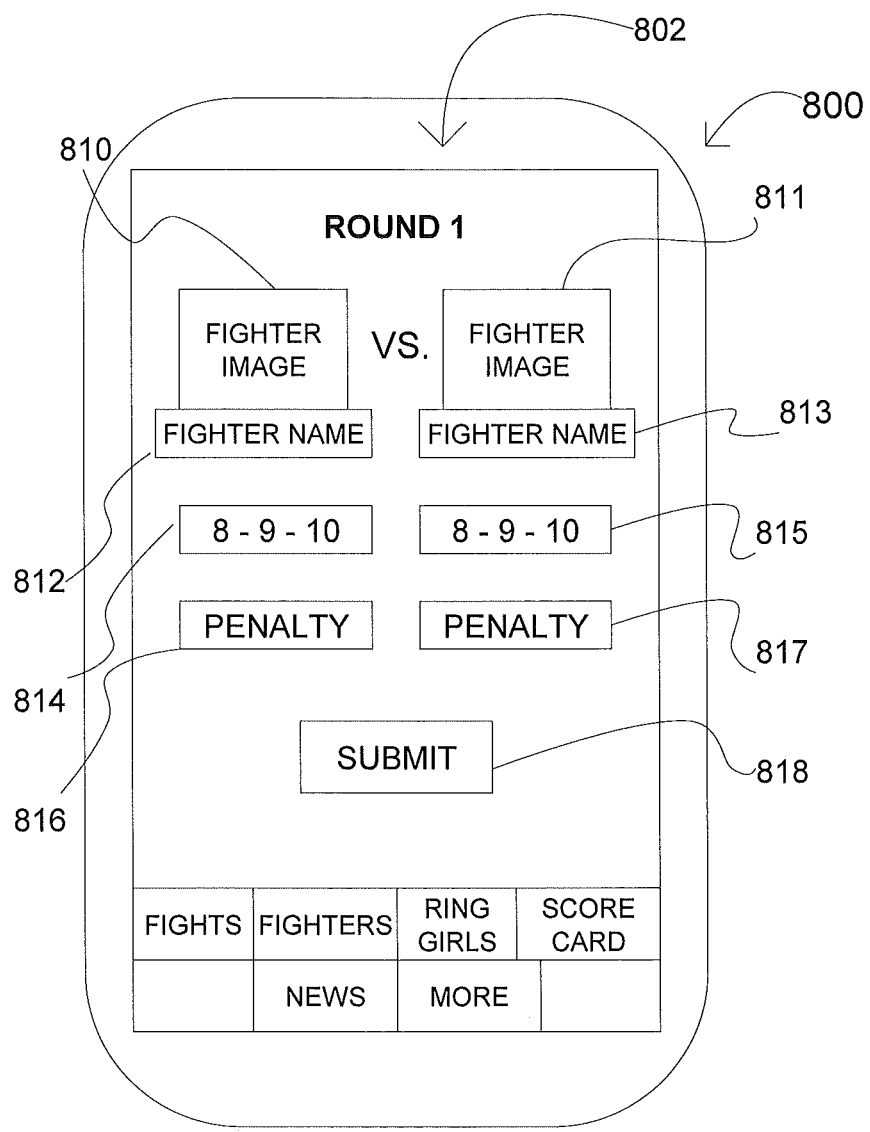
FIG. 8 is a user interface screen displaying event details for an event selected by an end user, as well as a scoring function for use in implementing the virtual scoring of real events in accordance with an exemplary embodiment.

Option 728 (SCORE CARD), upon selection by the user, in conjunction with a selected match (e.g., one of bars 716, 718, and 720), causes the player application 124 to data from the event card 126 associated with the selected match, and display the data via a display screen 802, an example of which is shown in FIG. 8. Option 730 (NEWS) enables the user to access other information that may be relevant to the event, and option 732 (MORE) may be configured by the enterprise serviced by the host system 102 to provide any desired features or supplemental information.

FIG. 8 illustrates an end user device 800 which corresponds to the end user device 104 of FIG. 1. The end user device 800 provides a display screen 802 including event details for a first round (ROUND 1) of a selected boxing match. As shown in FIG. 8, fighter images 810 and 811 for each fighter are shown, as well as fighter names 812 and 813 for each fighter are listed. Scoring elements are also shown in FIG. 8. A scoring box 814 and 815 for each fighter is presented, as well as penalty boxes 816 and 817, respectively. Since all of the event data for the match is downloaded with the event card 126, the user need not individually enter in the event details; they are automatically populated in the relevant associated fields and presented on the display screen, such as screen 802.

The user enters scores in the associated scoring boxes 814 and 815, as well as any penalties, if applicable, in boxes 816 and 817 for the round. Once the scores are entered, the user selects submit 818, and the entered scores are transmitted from the end user device 104 to the host system 102. This process may be repeated for each round until the event has completed. In an exemplary embodiment, where the user is viewing the event live and submitting scores in real time, the event scoring engine 117 is configured with a timing mechanism that monitors the beginning and the end of the rounds, and enables the submission of scores by end users during a designated window of time, e.g., immediately after the completion of a round and before the release of scores entered by the designated officiating entity. Likewise, the event scoring engine 117 is configured to disable a function that permits the submission of scores once the official scores from the designated officiating entity are released (e.g., are received by the officiating entity to the event scoring engine 117).

At step 212, the event scoring engine 117 tracks the score values submitted by the end user device 104, as well as other end user devices participating in scoring the event, and stores these values in the event record, e.g., in corresponding SCORE_VALUE fields for each member/subscriber ID. The event scoring engine 117 calculates score averages for each end user, as well as total score values for each end user. The event scoring engine 117 may also calculate aggregate scores for all end users, as well as averages for the collective group of end users.

At step 214, the event scoring engine 117 also tracks score values received from a designated officiating system for the event. The event scoring engine 117 releases the scores from the designated officiating system only after a defined period of time to ensure that no end user scores are received and processed after posting the official scores. As indicated above, the event scoring engine 117 includes a timing mechanism for this purpose.

At step 216, the control module 110 transmits the scores to the end user devices. At step 218, the event scoring engine 117 calculates an award status based on the collected score values and sets an award status indicator in a corresponding location in the event record. For example, the entity, e.g., casino may award points, discounts or free items and services offered through the stores, restaurants, hotel, etc. managed by the entity serviced by the host system 102. This reward indicator is stored in the REWARD_INDICATOR_VALUE of the data structure above, which corresponds to the MBR_ID having earned the reward.

Figure 9:
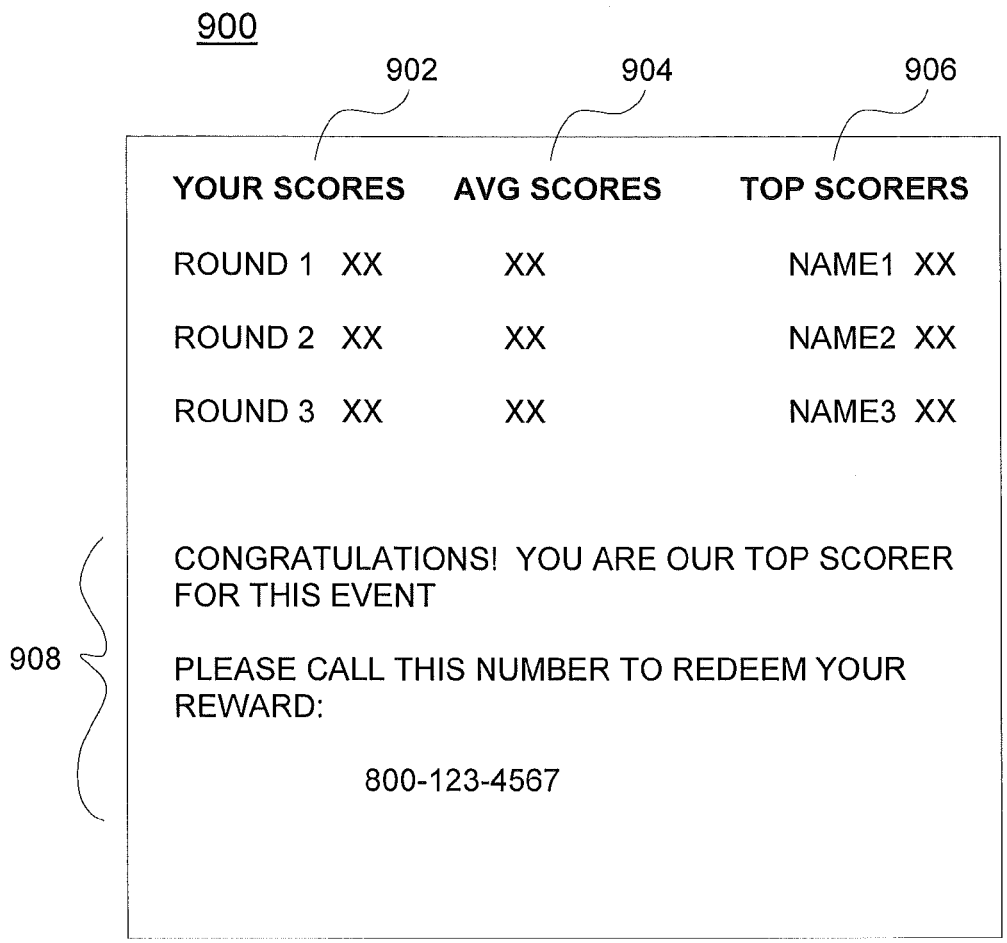
FIG. 9 is a user interface screen including scoring results and reward notification used in implementing the virtual scoring of real events in accordance with an exemplary embodiment.

As indicated above, the control module 110 transmits scores to the end user, e.g., via a user interface screen 900 of FIG. 9. As shown in FIG. 9, the summary may include scores submitted by the end user (902), average scores of all end users (904), and top scorers (906). Award information can be presented via this interface screen 900, such as that shown generally at 908.

As indicated above, the end user device 104 may choose to have the event streamed to the device 104, rather than physically attend the event. The event media system 116 may include hardware and software configured to record the event (e.g., digital camera equipment, communications interfaces, etc.). In one embodiment, the event media system 116 streams a live media feed of the event to the host system 102 or other system that enables end users to view the event in real-time or store a recording of the event on their end user devices, such that the end users can participate in scoring the event at their leisure. The provider of the viewing or recording of the event on the end user device 104 may offer this service for a fee.

Technical effects include event scoring in which virtual scoring of real events (also referred to herein as "event scoring") is provided. The event scoring enables individuals to participate in evaluating aspects of a real event and share this information with other individuals.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A system for implementing electronic entertainment scoring, the system comprising:
    a host system computer; and
    computer-readable instructions, stored on a non-transitory computer-readable medium, which when executed by the host system computer, causes the host system computer to perform the steps of:
        creating an event record for an event;
        receiving a request from an end user device to electronically participate in scoring the event;
        generating an event card, based on the event record, including event data for the event, the event data including an event date, event parties, and a scoring mechanism, the scoring mechanism enabling a user to submit a plurality of score values for the event;
        transmitting the event card to the end user device subject to the request, the event card configured to enable features of a computer program executing on the end user device, wherein the features include the scoring mechanism associated with the event card;
        entering an identifier of the user of the end user device in the event record, wherein the user is an observer of the event that is not a member of a designated officiating group for the event;
        tracking the plurality of score values submitted, at conclusion of the event, by the end user device in the event record via the identifier, the plurality of score values representing a rating of a qualitative performance of the event parties that is observed during the course of the event by the user; and
        transmitting, to the end user device, a summation of accumulated score values received from other end user devices that are electronically participating in the scoring of the event.

2. The system of claim 1, wherein the event is a competitive event judged via the designated officiating group, and the computer-readable instructions further causing the host system computer to perform the steps of:
    receiving a second plurality of score values from the designated officiating group; and
    transmitting, to the end user device, the second plurality of score values received from the designated officiating group of the event.

3. The system of claim 2, wherein the event is a live event and the user is observing the live event in real-time, and the computer-readable instructions further causing the host system computer to perform the steps of:
    activating a timer displaying an amount of time in which the user is permitted to submit the plurality of score values; and
    activating a disabling function upon expiration of the timer, the disabling function configured to prevent receipt of the plurality of score values, the disabling function activated prior to transmitting the second plurality of score values received from the designated officiating group.

4. The system of claim 3, wherein the event record further includes an award indicator field, and the computer-readable instructions further causing the host system computer to perform the steps of:
    receiving, at the end user device, a third plurality of score values of at least one other user electronically participating in scoring the event via another end user device;
    comparing the score values received from the end user device, the another end user device, and the designated officiating group;
    determining which of the end user device and the another end user device have score values closest to the score values of the designated officiating group;
    entering an award value in the award indicator field of the event record; and
    transmitting notification of an award to individuals in which corresponding event records contain the award value in the respective award indicator fields.

5. The system of claim 1, wherein the user is a member of an entity hosting the event, the entity issuing points to the member redeemable for goods and services offered through the entity, and the computer-readable instructions further causing the host system computer to perform the steps of:
    identifying the user through membership information stored by the entity;
    determining a point balance of the user;
    providing the user with an option to pay for the event card using points from the point balance; and
    decrementing the point balance commensurate with a cost of the event card responsive to acceptance by the user of the option;

wherein transmitting the event card is transmitted to the end user device upon receipt of payment.

6. The system of claim 5, wherein the computer-readable instructions further causing the host system computer to perform the step of:
generating a unique event card code identifying the event and an instance of the event card responsive to acceptance by the user to purchase the event card.

7. The system of claim 1, wherein the computer-readable instructions further causing the host system computer to perform the step of:
monitoring an event database for new events;
wherein creating an event record for an event is implemented in response to identifying a new event in the event database.

8. A non-transitory computer-readable medium having computer-readable instructions stored thereon for implementing event scoring, which when executed by a processor, causes the processor to perform the steps of:
creating an event record for an event;
receiving a request from an end user device to electronically participate in scoring the event;
generating an event card, based on the event record, including event data for the event, the event data including an event date, event parties, and a scoring mechanism, the scoring mechanism enabling a user to submit a plurality of score values for the event;
transmitting the event card to the end user device subject to the request, the event card configured to enable features of a computer program executing on the end user device, wherein the features include the scoring mechanism associated with the event card;
entering an identifier of the user of the end user device in the event record, wherein the user is an observer of the event that is not a member of a designated officiating group for the event;
tracking the plurality of score values submitted, at conclusion of the event, by the end user device in the event record via the identifier, the plurality of score values representing a rating of a qualitative performance of the event parties that is observed during the course of the event by the user; and
transmitting, to the end user device, a summation of accumulated score values received from other end user devices that are electronically participating in the scoring of the event.

9. The non-transitory computer-readable medium of claim 8, wherein the event is a competitive event judged via the designated officiating group, and computer-readable instructions further causing the processor to perform the steps of:
receiving a second plurality of score values from the designated officiating group; and
transmitting, to the end user device, the second plurality of score values received from the designated officiating group of the event.

10. The non-transitory computer-readable medium of claim 9, wherein the event is a live event and the user is observing the live event in real-time, and the computer-readable instructions further causing the processor to perform the steps of:
activating a timer displaying an amount of time in which the user is permitted to submit the plurality of score values;
activating a disabling function upon expiration of the timer, the disabling function configured to prevent receipt of the plurality of score values, the disabling function activated prior to transmitting the second plurality of score values received from the designated officiating group.

11. The non-transitory computer-readable medium of claim 10, wherein the event record further includes an award indicator field, and the computer-readable instructions further causing the processor to perform the steps of:
receiving, at the end user device, a third plurality of score values of at least one other user electronically participating in scoring the event via another end user device;
comparing the score values received from the end user device, the another end user device, and the designated officiating group;
determining which of the end user device and the other end user devices have score values closest to the score values of the designated officiating group;
entering an award value in the award indicator field of the event record; and
transmitting notification of an award to individuals in which corresponding event records contain the award value in the respective award indicator fields.

12. The non-transitory computer-readable medium of claim 8, wherein the user is a member of an entity hosting the event, the entity issuing points to the member redeemable for goods and services offered through the entity, and the computer-readable instructions further causing the processor to perform the steps of:
identifying the user through membership information stored by the entity; determining a point balance of the user;
providing the user with an option to pay for the event card using points from the point balance; and
decrementing the point balance commensurate with a cost of the event card responsive to acceptance by the user of the option;
wherein transmitting the event card is transmitted to the end user device upon receipt of payment.

13. The non-transitory computer-readable medium of claim 8, wherein the computer-readable instructions further causing the processor to perform the step of:
generating a unique event card code identifying the event and an instance of the event card responsive to acceptance by the user to purchase the event card.

14. The non-transitory computer-readable medium of claim 8, wherein the computer-readable instructions further causing the processor to perform the step of:
monitoring an event database for new events;
wherein creating an event record for an event is implemented in response to identifying a new event in the event database.

15. A computer-implemented method for electronic entertainment scoring, comprising:
creating, by at least one processor, an event record for an event;
receiving a request, from an end user device, to electronically participate in scoring the event;
generating, by the at least one processor, an event card, based on the event record, including event data for the event, the event data including an event date, event parties, and a scoring mechanism, the scoring mechanism enabling a user to submit a plurality of score values for the event;
transmitting the event card to the end user device subject to the request, the event card configured to enable features of a computer program executing on the end user device, wherein the features include the scoring mechanism associated with the event card;

entering an identifier of the user of the end user device in the event record, wherein the user is an observer of the event that is not a member of a designated officiating group for the event;

tracking, by the at least one processor, the plurality of score values submitted, at conclusion of the event, by the end user device in the event record via the identifier, the plurality of score values representing a rating of a qualitative performance of the event parties that is observed during the course of the event by the user; and transmitting, to the end user device, a summation of accumulated score values received from other end user devices that are electronically participating in the scoring of the event.

16. The method of claim 15, wherein the event is a competitive event judged via the designated officiating group, the method further comprising:

receiving, by the at least one processor, a second plurality of score values from the designated officiating group; and transmitting, to the end user device, the second plurality of score values received from the designated officiating group of the event.

17. The method of claim 16, wherein the event is a live event and the user is observing the live event in real-time, the method further comprising:

activating, by the at least one processor, a timer displaying an amount of time in which the user is permitted to submit scores; and activating, by the at least one processor, a disabling function upon expiration of the timer, the disabling function configured to prevent receipt of the plurality of score values, the disabling function activated prior to transmitting the second plurality of score values received from the designated officiating group.

18. The method of claim 17, wherein the event record further includes an award indicator field, the method further comprising:

receiving, at the end user device, a third plurality of score values of at least one other user electronically participating in scoring the event via another end user device;

comparing, by the at least one processor, the score values received from the end user device, the another end user device, and the designated officiating group;

determining, by the at least one processor, which of the end user device and the another end user device have score values closest to the score values of the designated officiating group;

entering, by the at least one processor, an award value in the award indicator field of the event record; and transmitting, by the at least one processor, notification of an award to individuals in which corresponding event records contain the award value in the respective award indicator fields.

19. The method of claim 15, wherein the user is a member of an entity hosting the event, the entity issuing points to the member redeemable for goods and services offered through the entity, the method further comprising:

identifying, by the at least one processor, the user through membership information stored by the entity;

determining, by the at least one processor, a point balance of the user;

providing, by the at least one processor, the user with an option to pay for the event card using points from the point balance; and decrementing, by the at least one processor, the point balance commensurate with a cost of the event card responsive to acceptance by the user of the option;

wherein transmitting the event card is transmitted to the end user device upon receipt of payment.

20. The method of claim 15, further comprising:

generating, by the at least one processor, a unique event card code identifying the event and an instance of the event card responsive to acceptance by the user to purchase the event card.

* * * * *